United States Patent [19]
Yamamoto

[11] Patent Number: 5,966,402
[45] Date of Patent: Oct. 12, 1999

[54] METHOD AND APPARATUS FOR DETECTING PILOT SIGNALS AND SUBSCRIBER

[75] Inventor: Katsuya Yamamoto, Tokyo, Japan

[73] Assignee: Sony Corporation, Tokyo, Japan

[21] Appl. No.: 08/746,873

[22] Filed: Nov. 18, 1996

[30] Foreign Application Priority Data

Nov. 22, 1995 [JP] Japan ................................. 7-304256

[51] Int. Cl.$^6$ ............................ H04B 15/00; H04K 1/00; H04L 27/30
[52] U.S. Cl. ........................... 375/200; 370/500; 455/525
[58] Field of Search ................................. 370/209, 342, 370/500, 441, 515; 375/200, 205, 206, 208; 455/502, 524–525

[56] References Cited

U.S. PATENT DOCUMENTS

| | | | |
|---|---|---|---|
| 5,533,047 | 7/1996 | Mourot et al. | 375/208 |
| 5,577,025 | 11/1996 | Skinner et al. | 370/209 |
| 5,644,591 | 7/1997 | Sutton | 375/200 |
| 5,781,543 | 7/1998 | Ault et al. | 370/342 |

*Primary Examiner*—Stephen Chin
*Assistant Examiner*—Joseph Roundtree
*Attorney, Agent, or Firm*—Jay H. Maioli

[57] ABSTRACT

A pilot signal detection method, a pilot signal detection apparatus and a subscriber in which the timing of a pilot signal of a neighbor base station is detected correctly and efficiently for improving the quality of communication of a mobile station. Partial correlation is taken of a pilot signal of an arbitrary base station within a first range of correlation. The pilot signal for which the result of the partial correlation has exceeded a first threshold becomes a pilot candidate signal for detection. Partial correlation is then taken of the pilot signal of the pilot candidate signal within a range of correlation broader than the first range of correlation. The pilot signal for which the result of the partial correlation has exceeded a second threshold becomes a pilot detection signal.

3 Claims, 6 Drawing Sheets

METHOD AND APPARATUS FOR DETECTING PILOT SIGNALS AND SUBSCRIBER

BACKGROUND OF THE INVENTION

1. Field of the Invention

This invention relates to a method and apparatus for detecting a pilot signal in a mobile communication system of the code division multiple access system, in which spread-spectrum signals transmitted from respective base stations are received and pilot signals are detected from the received spread-spectrum signals. The invention also relates to a subscriber for modulating the received spread-spectrum signals based on the pilot signal detected by the pilot signal detection method and apparatus.

2. Description of the Related Art

Among the communication systems used when a mobile station is used in common by plural base stations for communication, there is a code division multiple access (CDMA) system. This CDMA system is a system in which a signal modulated by a carrier frequency is spectrum-spread in accordance with a pre-set PN code and transmitted to, for example, a mobile station, and in which a receiver demodulates the signal with code synchronization using the same PN code for communication. In the mobile communication system employing the CDMA system, a subscriber (receiver of a mobile station) allocates the timing of the pilot signal transmitted by the base station to a demodulator which then demodulates the spectrum spread signal transmitted from the base station based on the timing of the allocated pilot signal.

The mobile communication system employing the CDMA system has already been standardized in the United States. The system standard in the subscriber prescribes the overall performance of the mobile station, including demodulation properties, such as message error rate (MER) as a result of demodulation at the subscriber in case the signal intensity of the pilot signal from plural base stations is varied in accordance with a specified pattern, or reliability of the message on the communication protocol to be transmitted by the mobile station as a result of recognition of a neighbor base station. However, there is no provision as to the method for detecting the timing of the pilot signal from the neighbor base station.

The subscriber performance can possibly be improved if, when detecting the timing of the pilot signals of the neighbor base stations, correlation of the pilot signal transmitted by the neighbor base station is taken perpetually and, on detection of a pilot signal from the neighbor base station not lower than a pre-set level, a message prescribed on the communication protocol is transmitted, at the same time as the timing of the detected pilot signal is immediately allocated to the demodulator.

However, if, at the time of detection of the timing of the pilot signal by the subscriber, the range of partial correlation is set to a larger value, the time required for partial correlation becomes larger in proportion to the size of the range of the partial correlation, although the detection accuracy of the timing of the pilot signal is improved. Moreover, the subscriber has to execute processing for correlation of the currently received pilot signal of the base station, allocation of the pilot signal to the timing demodulator, processing of the communication protocol and speech encoding/decoding, in addition to the above-described timing detection of the plot signal. Therefore, if it is attempted to improve accuracy in timing detection of the pilot signal, the processing time therefor is increased, a result of which the overall performance of the subscribed cannot be improved.

Thus it has been desired to develop an accurate and efficient method for detecting the timing of the pilot signal of the neighbor base station at the mobile station.

SUMMARY OF THE INVENTION

It is therefore an object of the present invention to provide a method and apparatus for detecting a pilot signal of a neighbor base station accurately and efficiently for improving the quality of the communication of the mobile station and a corresponding subscriber.

In one aspect, the present invention provides a pilot signal detection method in which spread-spectrum signals by the code division multiple access system are received from a plurality of base stations and a pilot signal of an arbitrary base station from the received spread-spectrum signals from the plural base stations is detected. Partial correlation is taken of the pilot signal of the arbitrary base station within a first range of correlation and a pilot candidate signal for detection is selected based on the comparison of the result of the partial correlation to a first threshold value. Partial correlation is then taken of the pilot candidate signal for detection within a second range of correlation broader than the first range of correlation. A pilot signal selected on the basis of comparison between the result of the partial correlation and a second threshold value becomes a pilot detection signal.

In another aspect, the present invention provides a pilot signal detection apparatus in which spread-spectrum signals by the code division multiple access system are received from a plurality of base stations and a pilot signal of an arbitrary base station is detected from the received spread-spectrum signals from the plural base stations. The pilot signal detection apparatus includes first search means for taking partial correlation of the pilot signal of the arbitrary base station within a first range of correlation and detection candidate decision means for selecting a pilot candidate signal for detection based on the comparison of the result of the partial correlation from the first search means to a first threshold value. The apparatus also includes second search means for taking partial correlation of the pilot candidate signal for detection obtained by the detection candidate decision means within a second range of correlation broader than the first range of correlation, and detection decision means for setting a pilot signal selected on the basis of comparison between the result of the partial correlation from the second search means and the second threshold value as a pilot detection signal.

In yet another aspect, the present invention provides a subscriber including reception means for receiving spread-spectrum signals by the code division multiple access system from a plurality of base stations, and pilot signal detection means for detecting a pilot signal of an arbitrary base station from the spread-spectrum signals of the plural base stations received by said reception means. The subscriber also includes demodulation means for demodulating the spread-spectrum signals received by the reception means based on the pilot signal detected by the pilot signal detection means. The pilot signal detection means includes first search means for taking partial correlation of the pilot signal of the arbitrary base station within a first range of correlation, detection candidate decision means for selecting a pilot candidate signal for detection based on the comparison of the result of the partial correlation from the first search means to a first threshold value, second search means for taking partial correlation of the pilot candidate signal for detection obtained by the detection candidate decision means within a second range of correlation broader than the first range of correlation, and detection decision means for setting a pilot signal selected on the basis of comparison between the result of the partial correlation from the second search means and the second threshold value as a pilot detection signal.

DESCRIPTION OF THE PREFERRED EMBODIMENTS

Figure 1:
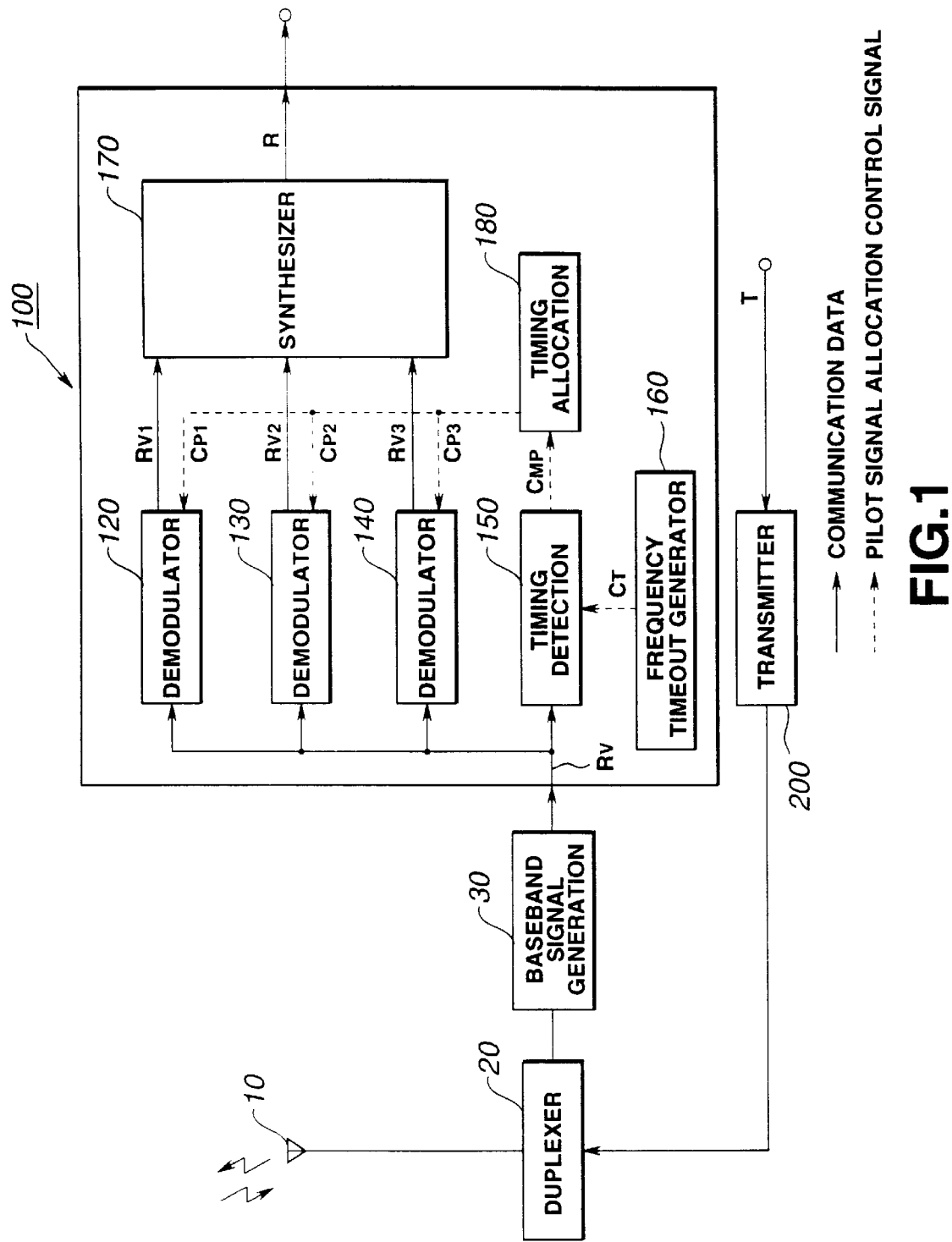
FIG. 1 is a block diagram showing the structure of a subscriber according to the present invention.

Referring to the drawings, preferred embodiments of the present invention will be explained in detail.

The pilot signal detection method according to the present invention is carried out by a timing detector 150 provided in a receiver of a mobile station (subscriber 100) as shown for example in FIG. 1. This timing detector 150 is a. pilot signal detection apparatus according to the present invention. A transmitter of the mobile station 200 transmits a signal T for transmission on spectrum spreading the signal for transmission T to pre-set frequency bands. A duplexer 20 discriminates the signal transmitted or received over an antenna 10.

First, the subscriber 100 uses the CDMA system and includes three demodulators 120, 130 and 140 fed with reception data Rv from the base station, a timing detector 150, a timing allocator 180 fed with an output of the timing detector 150, and a synthesizer 170 fed with outputs of the demodulators 120, 130 and 140.

The subscriber 100 also includes a timeout generator 160, an output of which is fed to the timing generator 150. An output of the allocator 180 is fed to the demodulators 120, 130 and 140.

In the above-described subscriber 100, a spread-spectrum signal, transmitted from an arbitrary one of the base stations, is received over the antenna 10. The spread-spectrum signal, received over the antenna 10, is provided to a baseband signal forming circuit 30 via duplexer 20 and is converted into a baseband signal by the baseband signal forming circuit 30 for generating digital data. This digital signal is fed as reception data Rv to the demodulators 120, 130 and 140 and to the timing detector 150.

The timeout generator 160 generates for the timing detector 150 a periodic timeout signal $C_T$ at a pre-set time interval. The period of generation of the timeout signal $C_T$ is pre-set to an arbitrary value not less than the sum of the time required for the demodulators 120, 130 and 140 to demodulate a usable signal component of the pilot signal (termed a multi-pass component) once, that is the time required to correlate the pilot signal of the received spread-spectrum signal once, and the time required for one timing allocation to the demodulators 120, 130 and 140.

During the time no timeout signal $C_T$ is generated by the timeout generator 160, communication protocol processing or speech coding/decoding is performed by a signal processing circuit, not shown.

When the timeout generator 160 generates the timeout signal $C_T$, the timing detector 150 channel-separates the pilot signal from the reception data Rv supplied thereto, based on the timeout signal $C_T$ from the timeout generator 160, for taking correlation within the range for correlation for detecting the multi-pass component $C_{MP}$ of the pilot signal. Taking correlation is also referred to hereinafter as searching. The timing detector 150 routes the detected multi-pass component $C_{MP}$ to the timing allocator 180.

The operation for detecting the pilot signal by the timing detector 150 will be explained later in detail.

The timing allocator 180 selects the timing of, for example, three multipass components $C_{MP}$, in the order of deceasing energy values, from the multipass components $C_{MP}$ from the timing detector 150. The timing allocator 180 routes the selected three multipass components as three timing control signals $C_{P1}$, $C_{P2}$ and $C_{P3}$, to the demodulators 120, 130 and 140, respectively.

The demodulator 120 inverse spectrum-spreads the reception data Rv supplied thereto, based on the timing control signal $C_{P1}$ from the timing allocator 180, and channel-separates the data for demodulation. The demodulator 120 routes the demodulated reception data to the synthesizer 170.

The demodulator 130 inverse spectrum-spreads the reception data Rv supplied thereto, based on the timing control signal $C_{P2}$ from the timing allocator 180, and channel-separates the data for demodulation. The demodulator 130 routes the demodulated reception data to the synthesizer 170.

The demodulator 140 inverse spectrum-spreads the reception data Rv supplied thereto, based on the timing control signal $C_{P3}$ from the timing allocator 180 and channel-separates the data for demodulation. The demodulator 140 routes the demodulated reception data to the synthesizer 170.

The synthesizer 170 synthesizes demodulated data $R_{V1}$, $R_{V2}$ and $R_{V3}$ from the demodulators 120, 130 and 140 to form synthesized data which is outputted as reception data R.

The above-mentioned demodulation operations are then carried out each time the timeout signal $C_T$ is generated by the timeout generator 160.

The operation of detecting the pilot signal by the timing detector 150 is now specifically explained.

Figure 2:
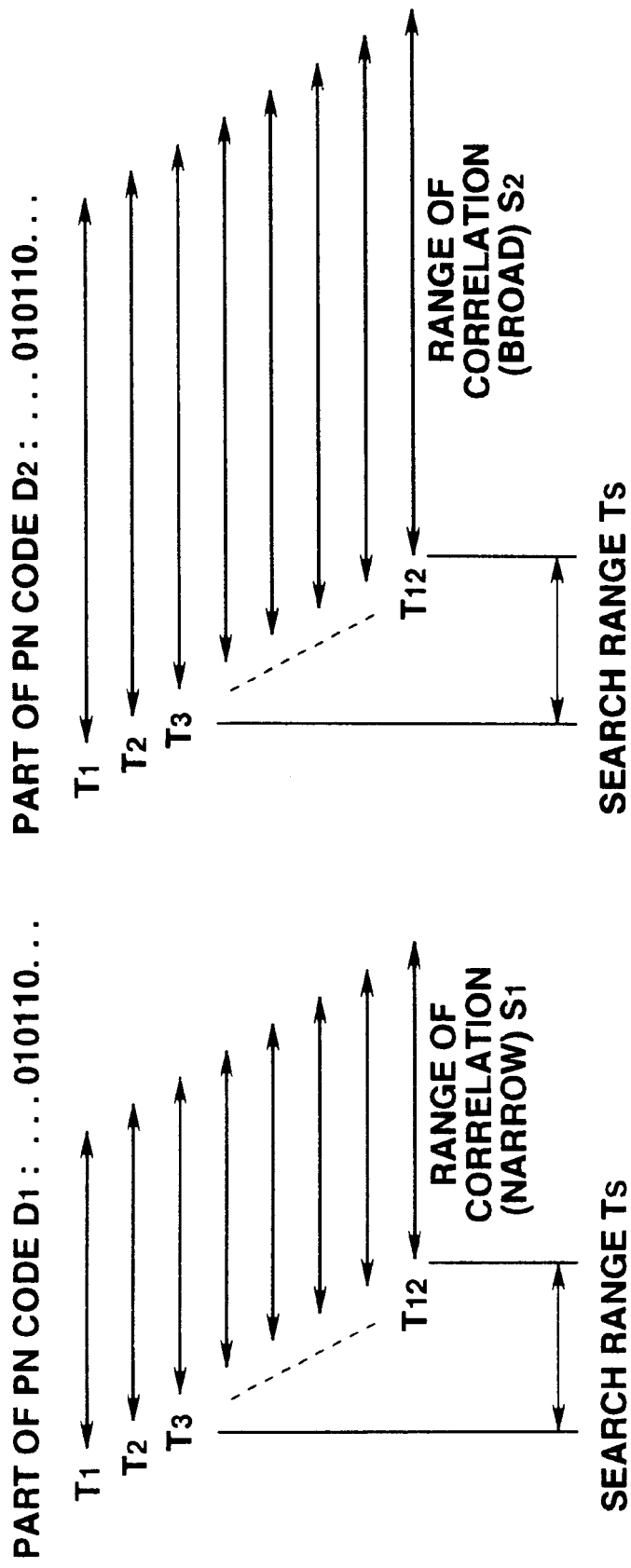
FIGS. 2a and 2b illustrates the processing for timing detection of a pilot signal for a narrow range of correlation and a broad range of correlation.

FIG. 2 shows a method for timing detection of the pilot signal over a narrow range $S_1$ and a method for timing detection of the pilot signal over a wide range $S_2$. In this figure, a PN code D denotes the timing of the PN code transmitted from the base station the signal of which is about to be received by the subscriber 100.

The PN code means a pseudo-random code of æ1' and æ0', used for spectrum-spreading the transmitted signal and for inverse spectrum-spreading the received spectrum-spread signal.

For example, in the mobile communication system employing the CDMA system, the PN code with a period of $2^{15}$ is used. Therefore, the timing detector 150 internally generates the PN code and takes correlation between the generated PN code and the received PN code. However, it is not proper for the timing detector 150 to take correlation of all code lengths of $2^{15}$ codes in view of the increased hardware scale and increased search time.

Therefore, if the timing of the pilot signal is to be detected within the narrow range of correlation $S_1$, as shown in FIG. 2, the timing generator 150 generates the PN code of the range for correlation, that is a portion $D_1$ of the PN code, for taking the correlation between the portion $D_1$ of the generated PN code and the code of the same range as the portion $D_1$ of the PN code in the received PN code D from the base station.

That is, the timing generator 150 first decides the range of the timing to be searched, for example, a range Ts of twelve timings $T_1$ to $T_{12}$, and generates the portion $D_1$ of the generated PN code at the decided timing $T_1$ within the range Ts, as shown in FIG. 2a. The timing detector 150 searches the portion $D_1$ of the generated PN code only for the range of correlation $S_1$. The timing detector 150 then repeats search as described above, as it shifts the timing of generating the portion $D_1$ of the PN code to $T_2, T_3, T_4$ and so forth.

For timing detection of the pilot signal over the broad range of correlation $S_2$ as shown in FIG. 2b, the timing detector 150 then repeats search for the broad range of correlation, as it shifts the timing of generating the portion $D_2$ of the PN code to $T_1, T_2, T_3, T_4$ and so forth, as in the case of detecting the timing of the pilot signal over the narrow range of correlation $S_1$, as described above.

Figure 3:
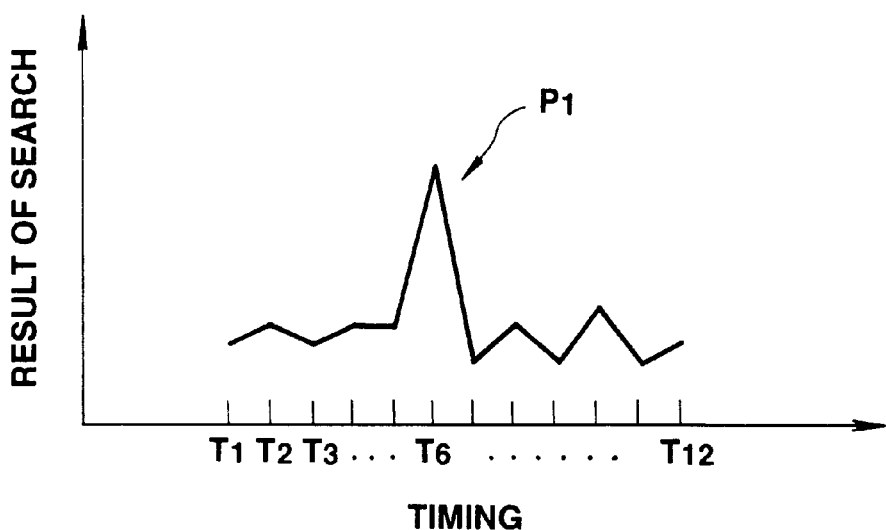
FIG. 3 illustrate the relation between the timing and the results of search in case of timing detection of the pilot signal over a narrow correlation range.
Figure 4:
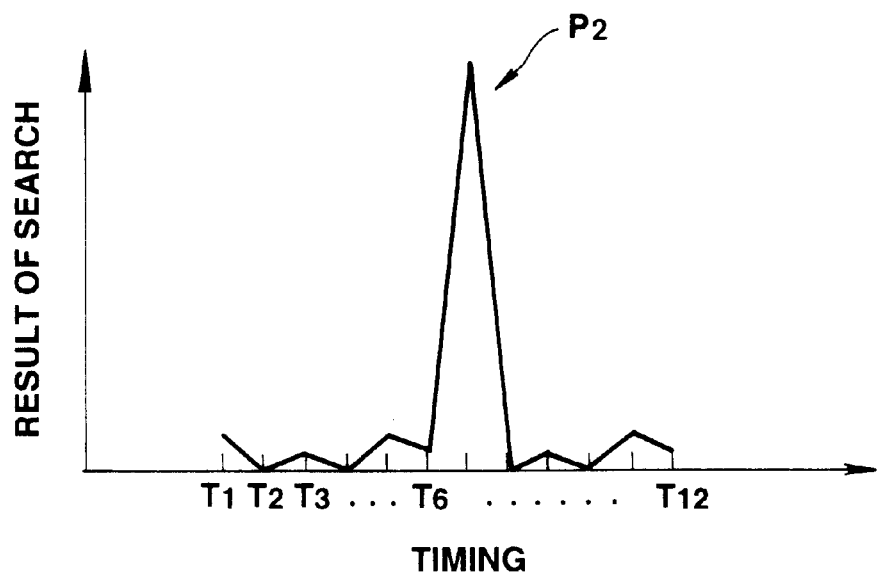
FIG. 4 illustrate the relation between the timing ad the results of search in case of timing detection of the pilot signal over a wide correlation range.

FIG. 3 shows the relation between the results of search and the timing in case timing detection of the pilot signal is performed over the narrow range of correlation $S_1$, while FIG. 4 shows the relation between the results of search and the timing in case timing detection of the pilot signal is performed over the broad range of correlation $S_2$. Meanwhile, FIGS. 3 and 4 show the results of search and the timing when the same timing $T_6$ of the same PN code exists at a mid portion on the abscissa.

Because of the partial correlation, referred to above, there exist multipass components $P_1, P_2$ having energies corresponding to the ranges of correlation $S_1, S_2$ as the results of search at the same timing $T_6$ of the PN code. That is, the multipass component $P_2$ with a higher energy can be obtained on timing detection of the pilot signal over the broad range of correlation $S_2$ than on timing detection of the pilot signal over the narrow range of correlation. Thus it is seen that the broader the range of correlation, the higher becomes the accuracy in the results of search.

However, the broader the range of correlation that is set, the longer becomes the length of the code for taking the correlation, thus increasing the time required for searching.

Figure 5:
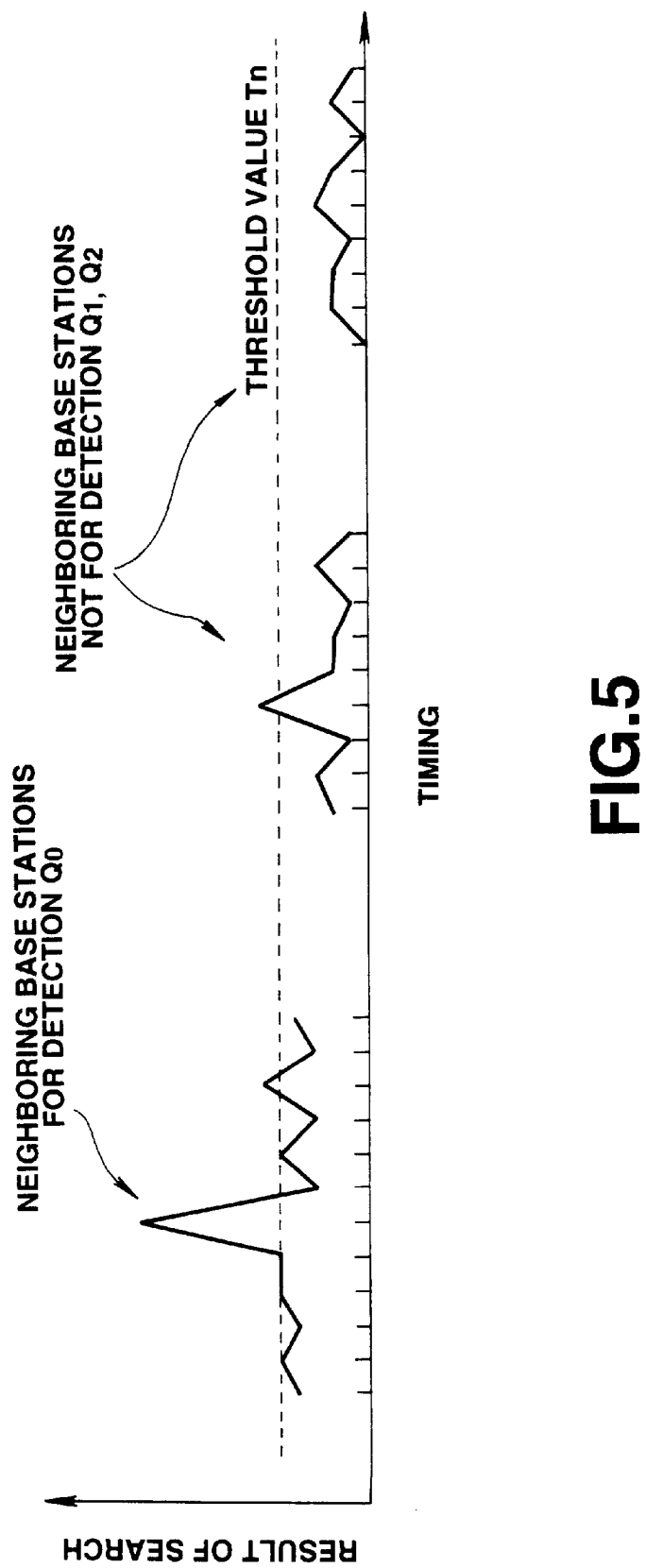
FIG. 5 illustrates a threshold value set for timing detection of the pilot signal over a narrow correlation range.
Figure 6:
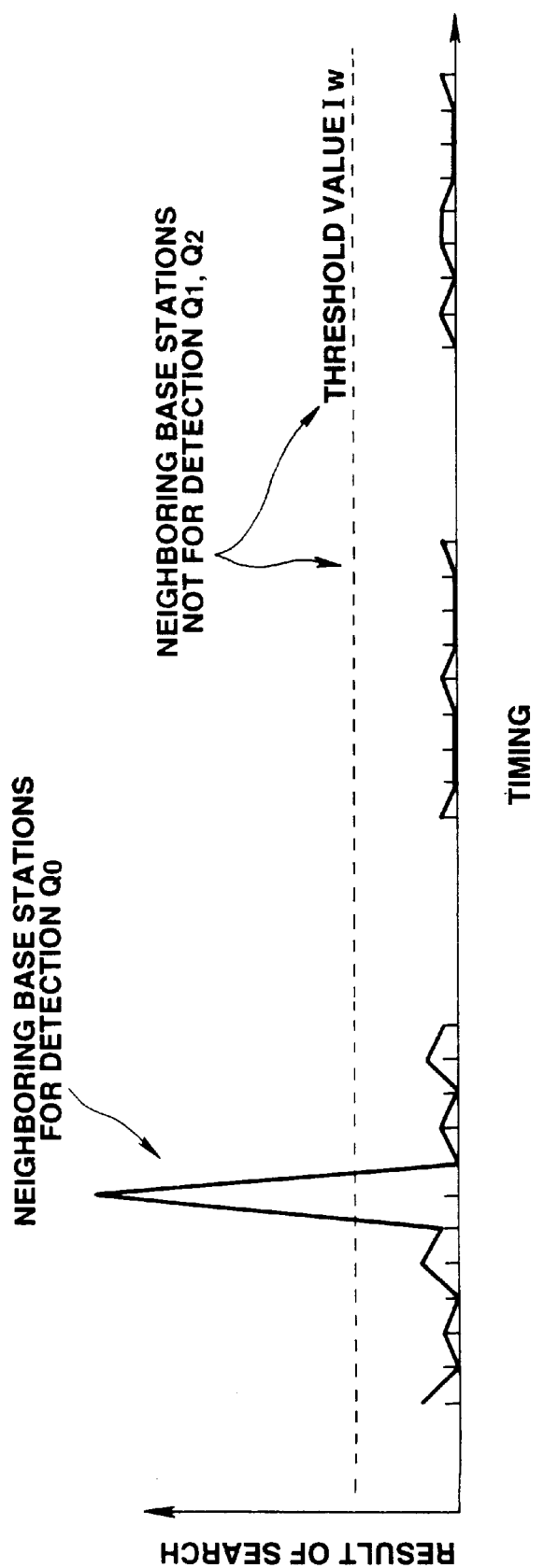
FIG. 6 illustrates a threshold value set for timing detection of the pilot signal over a broad correlation range.
Figure 7:
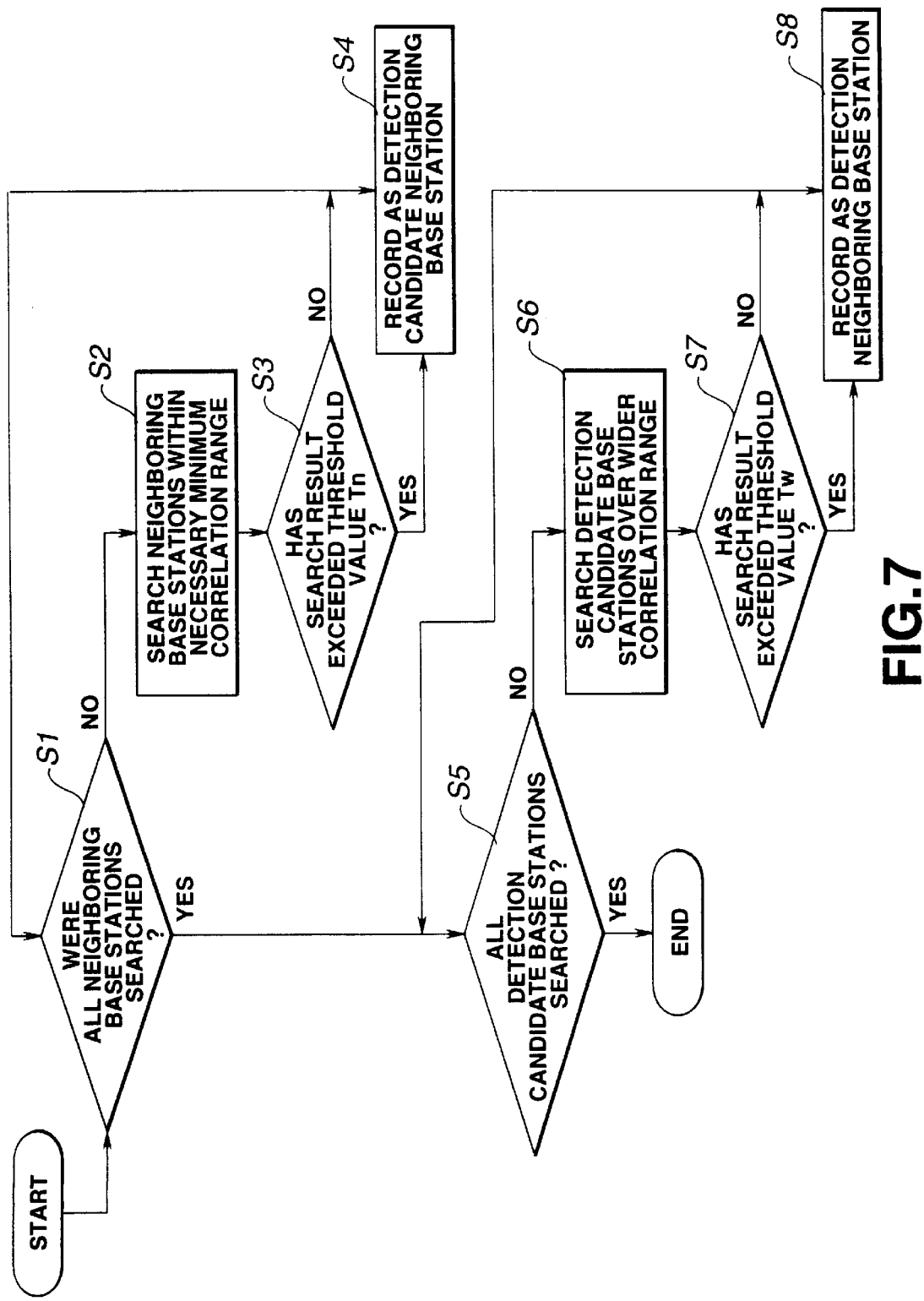
FIG. 7 is a flowchart showing the operation of timing detection of the pilot signal in a timing defector of the subscriber.

Thus, the timing detector 150 sets appropriate values $T_n$, and $T_w$ for the narrow range of correlation and for the broad range for correlation, respectively, as shown in FIGS. 5 and 6, respectively.

The threshold value $T_n$, set for the narrow range of correlation, is set to a value of the level that can detect the pilot signal $Q_0$ of the neighbor base station if the correlation is taken in a narrow necessary minimum range for which the timing detector 150 can detect the pilot signal $Q_0$ of the neighbor base station 1.

That is, the threshold value $T_n$ is selected so that, because of the narrow range of correlation, pilot signals $Q_1$ or $Q_2$ of neighbor base stations that should not be detected by the timing controller 150 are likely to be erroneously detected, but pilot signal $Q_0$ of the neighbor base station which should be detected by the timing detector 150 is necessarily detected.

On the other hand, the threshold value $T_w$, set for the broad range of correlation, is set to such a level that, if correlation is taken over a wide range for the pilot signals $Q_1$ and $Q_2$ of the neighbor base station which should not be detected by the timing detector 150, the pilot signals $Q_1, Q_2$ of the neighbor base station are not at all detected.

First, if the subscriber 100 is in the standby state, the subscriber 100 receives the information of the neighbor base station by receiving control channel from the currently received base station. That is, the subscriber 100 employing the CDMA system acquires, from the control channel, the information of the neighbor base station, such as the number of the neighbor base stations or the timing of the PN code of the neighbor base stations. The information of the neighbor base stations, thus acquired, is sent to the timing detector 150. The timing detector 150 starts detecting the pilot signal of the neighbor base stations.

When the pilot signal detection operation is instated, the timing detector 150 checks whether or not the pilot signals of all of the neighbor base stations have been searched (step S1). Since the pilot signals of all of the neighbor base stations have as yet not been checked at this time point, processing transfers to the next step S2.

At step S2, the pilot signal of a neighbor base station is searched within the necessary minimum range of correlation at the timing of the same pilot signal. The precessing of step S2 cones to an end in an extremely short time, as described above.

It is then checked at step S3 if, as a result of searching at step S2, the result of searching has exceeded the threshold value $T_n$ shown in FIG. 5.

If it is found at step S3 that the result of search has not exceeded the threshold $T_n$, processing reverts to step S1, in order to perform the processing of the steps S1 to S3 on the pilot signal of the next neighbor base station.

If it is found at step S3 that the result of search has exceeded the threshold $T_n$, the pilot signal of the neighbor base station currently processed is deemed to be a pilot candidate signal for detection, and multipass component or the like of the pilot signal is recorded on a memory, not shown (step 4). Processing then reverts to step S1 in order to perform precessing of steps S1 to S3 on the pilot signal of the next neighbor base station.

If the processing of step S1 to S4 has been performed on the pilot signals of all neighbor base stations recognized by the timing generator 150 and it s found at step S1 that the pilot signals of the neighbor base stations have all been searched, precessing transfers to the nest step S5.

At step S5, it is checked whether or not the pilot candidate signals for detection recorded on the memory at step S4 have all been searched over a broad range of correlation. Since all of the pilot candidate signals for detection have not as yet been searched at this time point, processing transfers to the next step S6.

At step S6, the pilot candidate signals for detection which have been recorded on the memory and searching for which has not come to a close are searched over a broad range of correlation the timing of these pilot signals. The processing of step S6 is performed on the pilot candidate signals for detection recorded on the memory and is time-consuming as described above. However, the processing is a search operation of extremely high accuracy.

Next, it is checked at step S7 whether or not the result at step S6 has exceeded the threshold $T_w$ shown in FIG. 6.

It is found at step S7 that the result of the search has not exceeded the threshold $T_w$, precessing reverts to step S5 in order to perform the processing of the steps S5 to S7 on the next pilot candidate signal for detection.

It is found at step S7 that the result of the search has exceeded the threshold $T_w$, the pilot candidate signal for detection currently under consideration is deemed to be a detection pilot signal and the multipass component or the like of the pilot signal is recorded on the memory. Processing then reverts to step S5 in order to perform processing of the steps of S5 to S7 on the next pilot candidate signal for detection recorded on the memory.

The processing of the steps S5 to S8 is performed as described above on all of the pilot candidate signals for detection recorded on the memory. If it is found at step S5 that the pilot candidate signals for detection have all been searched, the present processing is terminated.

Also, if no pilot candidate signal for detection has been recorded on the memory, it is judged at step S5 that there is no pilot signal to be detected and hence the processing is terminated.

The multipass components of the detected pilot signal, obtained as described above, are supplied to the timing allocator 180.

As described above, the timing detector 150 takes partial correlation of the pilot signals of the neighbor base stations within the necessary minimum range of correlation and the pilot signal of a neighbor base station which has exceeded a pre-set threshold as a result of the partial correlation is deemed to be a pilot candidate signal for detection. The range of correlation of the pilot candidate signal for detection is then enlarged and again the partial correlation is taken of the signal for correctly and efficiently detecting the timing of the pilot signal of the neighbor base station for improving the quality of communication of the mobile station.

I claim:

1. A pilot signal detection method in which spread-spectrum signals in a code division multiple access system are received from a plurality of base stations forming respective received spread-spectrum signals and a pilot signal of an arbitrary base station from the received spread-spectrum signals from the plurality of base stations is detected, comprising the steps of:

taking a first partial correlation of the pilot signal of the arbitrary base station within a first range of correlation;

selecting a pilot candidate signal for detection based on a comparison of a result of the partial correlation to a first threshold value;

taking a second partial correlation of the pilot candidate signal for detection within a second range of correlation broader than the first range of correlation; and selecting a pilot signal based on a comparison between a result of the second partial correlation and a second threshold value, whereby the selected Dilot signal becomes a pilot detection signal.

2. A pilot signal detection apparatus in which spread-spectrum signals in a code division multiple access system are received from a plurality of base stations forming received spreads-spectrum signals and a pilot signal of an arbitrary base station is detected from the received spread-spectrum signals from the plurality of base stations, comprising:

first search means for taking a partial correlation of the pilot signal of the arbitrary base station within a first range of correlation;

detection candidate decision means for selecting a pilot candidate signal for detection based on a comparison of a result of the partial correlation from the first search means to a first threshold value;

second search means for taking a partial correlation of the pilot candidate signal for detection obtained by the detection candidate decision means within a second range of correlation broader than the first range of correlation; and detection decision means for setting a pilot signal selected on a basis of comparison between a result of the partial correlation from the second search means and the second threshold value, whereby the set pilot signal is a pilot detection signal.

3. A subscriber receiver in a mobile station comprising:

reception means for receiving spread-spectrum signals in a code division multiple access system from a plurality of base stations;

pilot signal detection means for detecting a pilot signal of an arbitrary base station from the spread-spectrum signals of the plurality of base stations received by said reception means; and demodulation means for demodulating the spread-spectrum signals received by said reception means based on the pilot signal detected by said pilot signal detection means;

said pilot signal detection means including:

first search means for taking a partial correlation of the pilot signal of the arbitrary base station within a first range of correlation;

detection candidate decision means for selecting a pilot candidate signal for detection based on a comparison of a result of the partial correlation from the first search means to a first threshold value;

second search means for taking a partial correlation of the pilot candidate signal for detection obtained by the detection candidate decision means within a second range of correlation broader than the first range of correlation; and detection decision means for setting a pilot signal selected on a basis of a comparison between a result of the partial correlation from the second search means and the second threshold value, whereby the set pilot signal is a pilot detection signal.

* * * * *